H. & P. MUELLER.
COMBINED WASTE AND OVERFLOW.
APPLICATION FILED JAN. 30, 1909.

962,577.

Patented June 28, 1910.
2 SHEETS—SHEET 2.

Witnesses.

Inventors
Henry Mueller
Philip Mueller
by John L. Waddell
Attorney.

UNITED STATES PATENT OFFICE.

HENRY MUELLER AND PHILIP MUELLER, OF DECATUR, ILLINOIS, ASSIGNORS TO THE H. MUELLER MANUFACTURING COMPANY, OF DECATUR, ILLINOIS, A CORPORATION OF ILLINOIS.

COMBINED WASTE AND OVERFLOW.

962,577.  Specification of Letters Patent.  Patented June 28, 1910.

Application filed January 30, 1909. Serial No. 475,155.

*To all whom it may concern:*

Be it known that we, HENRY MUELLER and PHILIP MUELLER, citizens of the United States, and residents of Decatur, Macon county, State of Illinois, have invented new and useful Improvements in a Combined Waste and Overflow; and our preferred manner of carrying out the invention is set forth in the following full, clear, and exact description, terminating with claims particularly specifying the novelty.

This invention relates to baths and closets and more especially to bath and basin fittings, and the object of the same is to facilitate the attachment of the fitting to a tub or basin and the connection and joint made more certain; another object is to lessen the labor and insure the location of the fitting and the making of the joint in less time than heretofore without sacrificing the utility of the fitting, and prevent the gasket from slipping out of position on the fitting and passing the aperture.

To this end the invention consists in a fitting which comprises a T joint provided with a horizontal pipe bearing an elbow at its extremity which is suitably attached to the waste opening of a tub, and a similar vertical pipe bearing an elbow at its upper extremity connected to the overflow from the tub. The upper elbow is provided with a flange and a rib extending perpendicular thereto against which flange and around said rib fits a gasket, and inwardly extending lugs on the edges of the rib which enter the aperture of the tub. The elbow is adapted to be engaged by a screw through a grate from the inside of the tub and to be clamped to the tub wall forming a joint, and when the fitting is thus complete it constitutes what is commonly known as a waste and overflow, the upper connection being known as the overflow.

The following specification sets forth certain embodiments of the idea in its preferred form in which the accompanying drawings form a part thereof.

Figure 1:
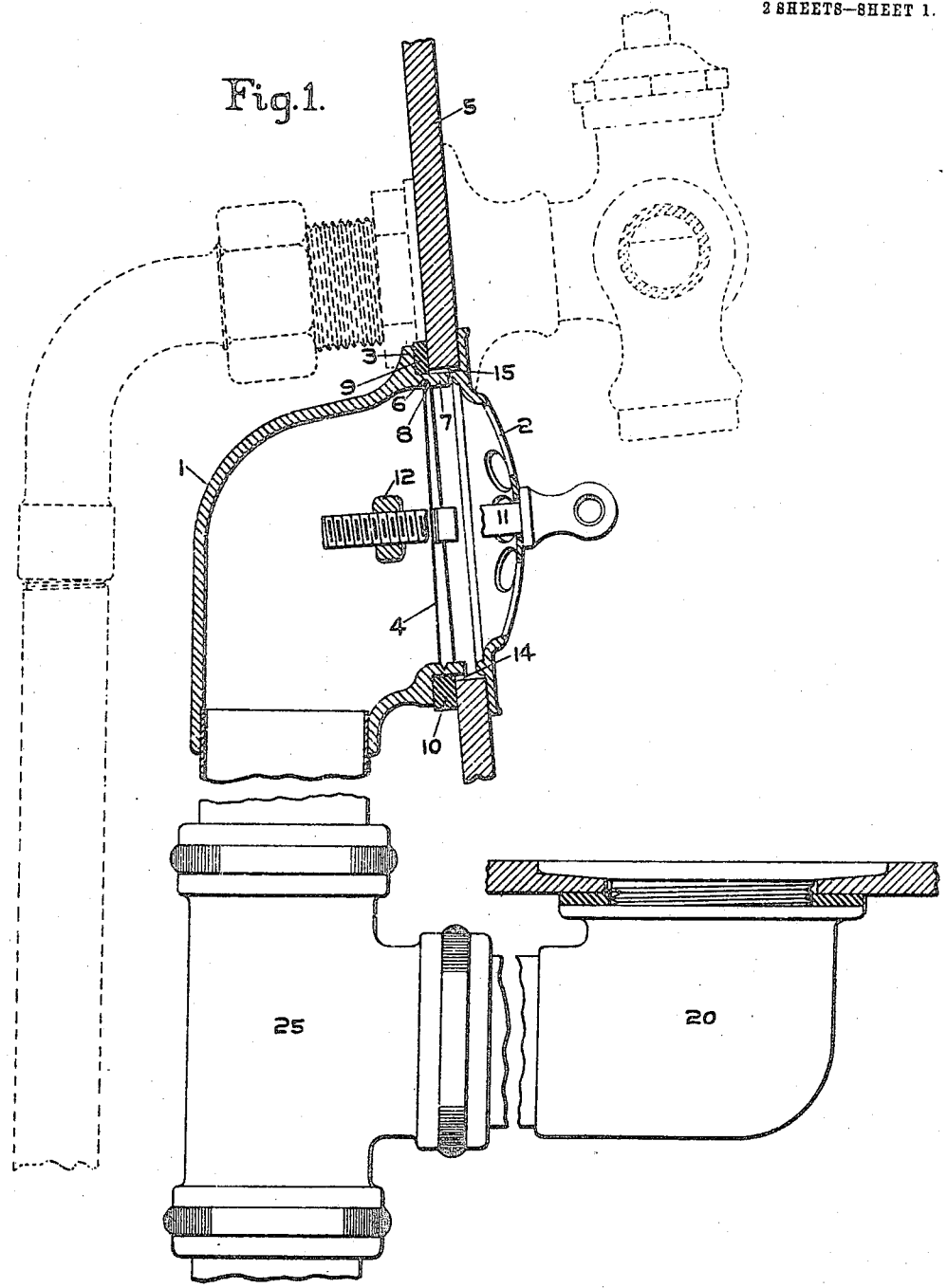
Figure 2:
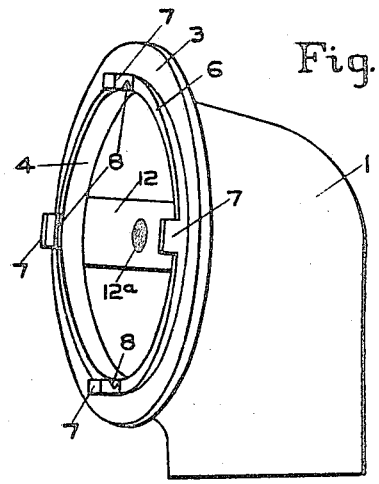
Figure 3:
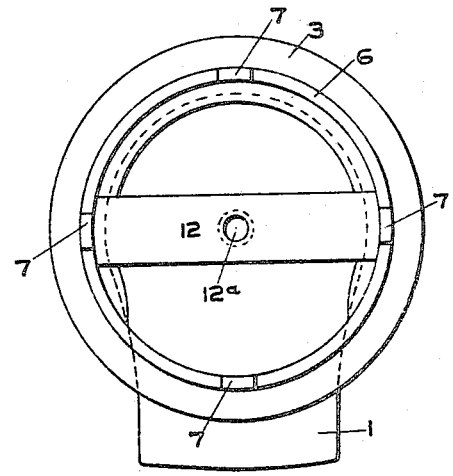
Figure 4:
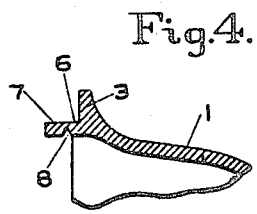

Figure 1 is a side elevation of the complete device embodying the invention showing the wall of a tub and overflow elbow in section; Fig. 2 is a perspective of the overflow elbow only, with the grate and gasket removed; Fig. 3 is a front view of the overflow elbow only, with the grate and gasket removed; and Fig. 4 is a fragmentary view of one part of the flanged end of the elbow in section showing the lug and other detail.

In setting up the usual bath tub and its fittings, the general practice is to bring the tub into position and connect the supply and the cock. The connecting tee of the combined waste and overflow is fixed in its relation to the outlet above the floor and connected with the waste by the insertion of the pipe connecting the waste elbow with the tee in any suitable manner, preferably a slip joint; and the pipe bearing the overflow elbow is brought by the hand of the workman to the outer side of the tub opposite the aperture provided for the overflow. A gasket is fitted against the smooth surface of the flanged end of the overflow elbow and the grate attached to said elbow from the inside of the tub and tightened by means of a screw threaded bolt, thus clamping the gasket between the smooth surface of the exterior wall of the tub and the smooth flanged end of the elbow, and a joint made between the elbow and the tee in the usual manner, preferably by slip joint. The overflow is, as a rule, applied and connected in cramped quarters where the rim of the tub stands close to the wall or other fixture and it is difficult for the workman to make the connection, because of the limited space and the inconvenience of handling the fitting therein and the impossibility of observing the relation of the gasket to the exterior of the tub wall and the elbow in its position to the aperture, thus making it very difficult to always form a joint between the tub wall and the overflow and oftentimes in making the joint between the tee and the elbow, the elbow may be pushed downward or away from the aperture in the tub and allow the gasket to pass said aperture one way or another, thus causing the connection to leak.

By the present invention I do away with the necessity of guessing at the joint made between the tub wall and the overflow elbow; I also do away with the smooth flat surface on the connecting end of the elbow and provide a shoulder around which the gasket fits in order to hold it in position, and on this shoulder provide means for accurately locating the aperture from the exterior of the tub and out of view of the workman, and thereby further prevent the elbow from extending above or below, out of alinement with the aperture to such an extent as to disconnect with the overflow opening. The outer connection between the waste and the overflow, as the tee above mentioned, is made at or near the floor line where the workman has sufficient room and light to perform the work.

Referring to the accompanying drawing, the numeral 1 indicates the overflow head or elbow of a combined waste and overflow to a bath tub or other sanitary fitting, the same being connected with a grate 2 and provided with a flange or shoulder 3 which bears against a gasket such as 10 compressing it against the wall of the tub 5, thus forming a joint therebetween. This head is provided with a rib or extension around the inside of the said flange 3 as will be indicated at 6, the same being located entirely around the opening and is integral with the head and flange forming a rim 4. On the rim 4 of the rib 6 are lugs 7 which extend beyond said rim. The gasket 10 when placed in position fits over the lugs 7 and the rib 6, and bears against the flat surface of the flange 3. At 9 attention is called to the variance in the thickness of the gasket. I also provide a groove or seam 8 on the inner side of the lugs 7 flush with the rim of the rib 6 in order that the lugs may be readily removed when desired; the provision of the ribs is made on account of the universal adaptation of the fitting to fixtures having various sized apertures, and while it is desired that the said lugs 7 for the most part enter the aperture to a greater or less extent, where the fixture will not permit this on account of the thinness of the wall of said fixture, the lugs are removed and the fitting brought flush against the wall of the fixture allowing the gasket, which may be of any suitable material, to be compressed between the wall and the flange 3 and held in position by the tension established between the grate 2 with its bearing surface 16, and plate screw 11, said screw engaging a cross bar 12 in the head 1 by means of a threaded aperture 12ª, best seen in Fig. 2.

At 14 and 15 in Fig. 1 may be seen the probable space between the wall of the aperture and the lugs 7 and it will be noticed that the gasket 10 is smaller in inside diameter than the aperture.

In application to the tub wall, the plumber may draw the fixture to a desired position with the tee 25 connected to the outlet pipe at the floor, and the elbow 20 to the waste of the tub and by taking the elbow or head 1 in the hand, pass along the outer wall of the tub until the aperture is reached, this being indicated to him by the fitting in the aperture of the lugs 7, the gasket 10 being in position when the elbow is placed. The grate 2 is placed in position from the inside of the tub and the screw 11 tightened. The joint is made between the tee and the elbow or head 1 in a well-known manner and then the screw 11 further tightened until a joint is formed between the gasket and the wall of the tub, the gasket being positive in its lap beyond the aperture because it is held in place by the flange 3 and the rib 6, preventing dislodgement or displacement of the same allowing leakage.

What we claim as new and desire to secure by Letters Patent is:

1. In a combined waste and overflow, the combination of an elbow having an intake for connecting with the outflow aperture in the tub, a flange thereon to engage the outer side of said tub, a grate within the tub adapted to be connected to the elbow, a circular rib adjacent the flange on the inner edge of the elbow, a gasket adapted to frictionally engage said rib, and a number of straight integral lugs on the edge of said rib parallel to the axis of the same for quickly engaging said aperture when the parts are assembled.

2. In a combined waste and overflow an elbow having an intake, a flange projecting outwardly from said intake to form a bearing for the elbow, a forwardly projecting rib surrounding the intake, and a number of straight integral lugs projecting from the edge of said rib parallel to the axis of the intake.

3. In a combined waste and overflow, an elbow having an intake, a flange projecting outwardly from said intake to form a bearing for the elbow, a forwardly projecting rib surrounding the intake adjacent the said flange, and a number of straight integral lugs on the edge of said rib parallel to the axis of the intake, said lugs having notches on their inner side at the junction of the lugs with the rib.

4. In a combined waste and overflow, the combination of an elbow having an intake for connecting with the outflow aperture in the tub, a flange thereon to engage the outer side of said tub, a grate within the tub adapted to be connected to the elbow, a circular rib adjacent the flange on the inner edge of the elbow, a gasket adapted to frictionally engage said rib, and a number of straight integral lugs, said lugs having notches formed on their inner faces at the junction of the lugs with said rib to permit said lugs to be broken off when necessary.

In testimony whereof, we have hereunto subscribed our signatures, this 29 day of December, A. D. 1908.

HENRY MUELLER.
PHILIP MUELLER.

Witnesses:
E. BROWN,
VIRGINIA HAMILTON.